Aug. 11, 1925.                                              1,549,033
E. H. STILL
APPARATUS FOR HEATING WATER
Filed Jan. 5, 1923          3 Sheets-Sheet 1
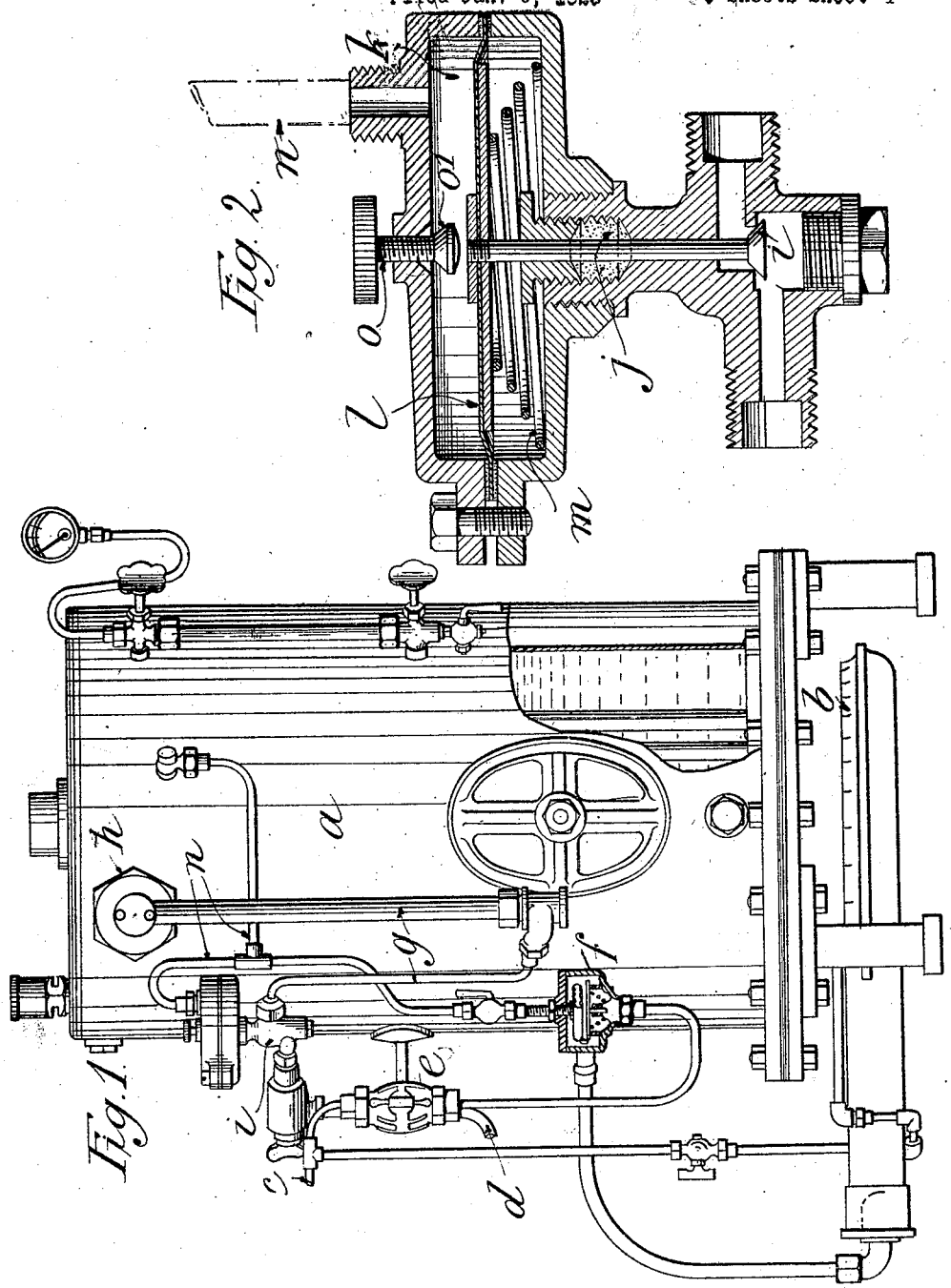
INVENTOR
Ernest Henry Still
BY Julian C. Dowell
ATTORNEY Aug. 11, 1925.                                                    1,549,033
E. H. STILL
APPARATUS FOR HEATING WATER
Filed Jan. 5, 1923                        3 Sheets-Sheet 3

Inventor
Ernest Henry Still
By Julian C. Dowell
his Attorney

Patented Aug. 11, 1925.

1,549,033

UNITED STATES PATENT OFFICE.

ERNEST HENRY STILL, OF LONDON, ENGLAND.

APPARATUS FOR HEATING WATER.

Application filed January 5, 1923. Serial No. 610,858.

*To all whom it may concern:*

Be it known that I, ERNEST HENRY STILL, a subject of the King of Great Britain and Ireland, residing at Hatton Garden, in the city of London, England, have invented Improvements in Apparatus for Heating Water, of which the following is a specification.

This invention has reference to apparatus for heating water more especially for making coffee, tea and other infusions one of the objects being, upon the drawing off of an unusually large quantity of boiling water and wide opening of the float valve regulating the water supply, to prevent such an entry of water by way of said valve as will result in the boiler being refilled with cold water so quickly that no more water at the required temperature can be obtained for a considerable period.

For this purpose the admission of water to the boiler through the float valve is controlled by a valve adapted to respond to variations in the intrinsic energy of the water in the boiler, that is to say to open as the pressure or temperature in the boiler rises and close as the pressure or temperature falls, the arrangement being such that, when the pressure or temperature in the boiler is considerably lowered, the valve will so restrict the admission of water through the float valve that the water will be quickly raised to the desired temperature, and there will be no interval during which boiling or hot water cannot be obtained. Another object of the invention is to enable the supply of heating agent to be varied inversely to the water supply as an unusually large quantity of water is being drawn off. To this end the means controlling the heating agent is influenced mutually with the water controlling means.

The heating agent may be gas, steam or electric current.

In the accompanying drawings Fig. 1 illustrates a gas heated boiler in which the admission of water to the boiler through a float valve is controlled by a valve adapted to be opened by the steam pressure against the action of a spring. Fig. 2 shows the valve in section.

Referring to Fig. 1 the boiler $a$ which is of tubular type, is mounted above gas burners $b$; $c$ is the gas supply connection and $d$ the water supply connection, the gas and water supplies being simultaneously turned on and off by a combination cock at $e$ and the flow of gas to the burners being controlled by a valve at $f$ actuated by a diaphragm subject to the steam pressure in the boiler, the valve being free to open when the boiler pressure falls and closing when it rises to the required extent, all as well understood. The water supply to the boiler passes from the duplex valve at $e$ through pipes $g$ to a float operated valve $h$ at the bottom of a pipe $g^1$ communicating through a cap $g^2$ with the boiler $a$, but, according to the present invention a valve, such as is shown in section in Fig. 2, is inserted at $i$ to control the supply of water to the float valve. $h^1$ is the float which actuates the valve $h$ through a rod $h^2$. The stem of this valve $i$ extends through a stuffing box $j$ into a chamber $k$ containing a diaphragm $l$ to which the valve stem is attached; a spring $m$ presses against one side of the diaphragm so as to draw the valve towards its seat and the opposite side of the diaphragm is exposed to the steam pressure in the boiler, the chamber $k$ being connected thereto by the piping $n$ as shown in Fig. 1. The same piping $n$ allows the steam pressure to act upon the gas control valve $f$. The cover of the diaphragm chamber $k$ is fitted, opposite the centre of the diaphragm, with a screw $o$ so that the valve $i$ may be opened against the action of the spring $m$ when there is no pressure in the boiler and it is desired to admit water to it for washing out or otherwise; the outer end of the screw has fixed to it a milled head and its inner end is coned at $o^1$ so that it will make a tight joint with a correspondingly coned seat in the cover when screwed back to permit movement of the diaphragm and valve.

In cases where the water in the boiler is never under pressure, the valve $i$ may be actuated by a thermostatic device, such as an expansible fluid-containing capsule, which may communicate with a closed tube extending into the water space of the boiler, acting in opposition to a spring tending to close the valve, the condition of the thermostatic device depending on the temperature of the water in the boiler.

Figure 3:
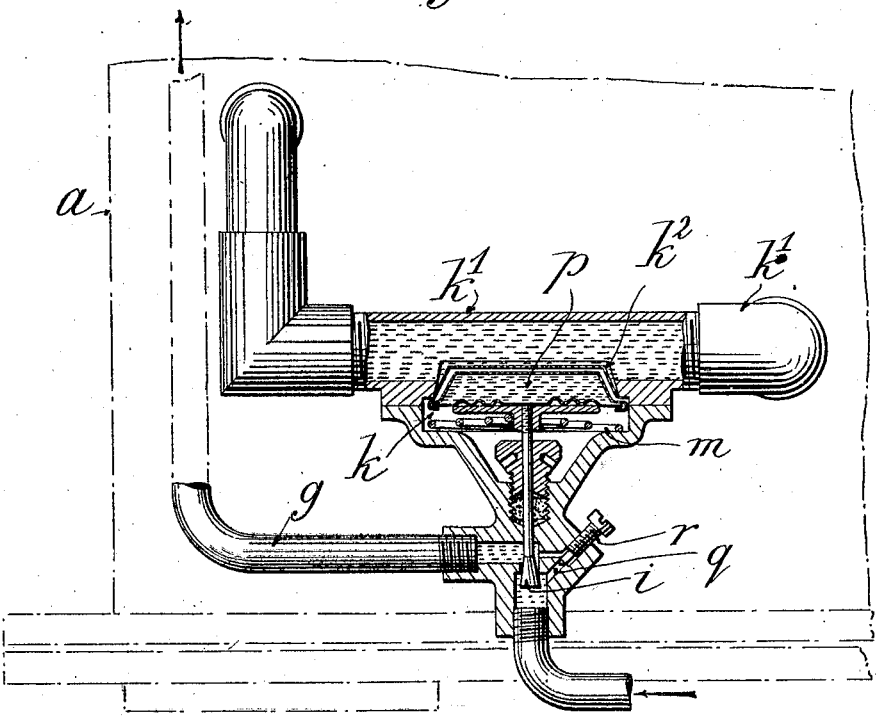
Fig. 3 shows in section a water controlling valve adapted to be opened by a thermostatic device.

Fig. 3 illustrates a thermostatically actuated valve; $p$ is the expansible capsule acting on the stem of the valve $i$ in opposition to the spring $m$ and held in place by the cover of the chamber $k$ which is formed with branches $k^1$ that are connected to the water space of the boiler at different levels. The cover of the chamber $k$ is formed with a dished thin metal wall $k^2$ soldered to the casting and the capsule $p$ fits snugly into the dished wall as shown, by which arrangement risk of leakage is avoided. On the temperature of the water rising the capsule expands and opens the valve, whilst on the temperature falling the capsule contracts and the spring closes the valve. As will be seen, instead of a screw for opening the valve $i$ when there is no pressure in the boiler, a by-pass $q$ with a screw $r$ is provided so that water may be allowed to pass to the boiler when desired.

Figure 4:
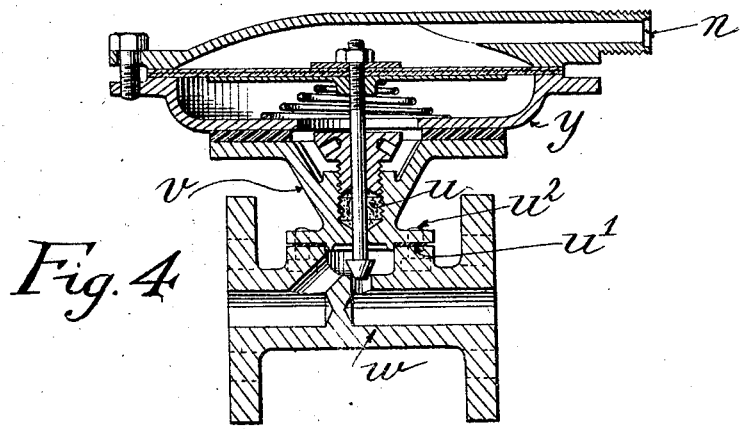
Fig. 4 shows in section a valve for controlling the supply of steam to a steam heated boiler.

In both arrangements, the valve $i$ is rapidly adjusted to conditions in the boiler and hot water is always available in a short time.

Where steam is the heating agent it is sometimes desirable that the valve for its control should be inserted in the steam supply pipe some little distance away from the boiler and in that case the valve shown in Fig. 4 may advantageously replace the ordinary gas valve shown at $f$ in Fig. 1.

Figure 6:
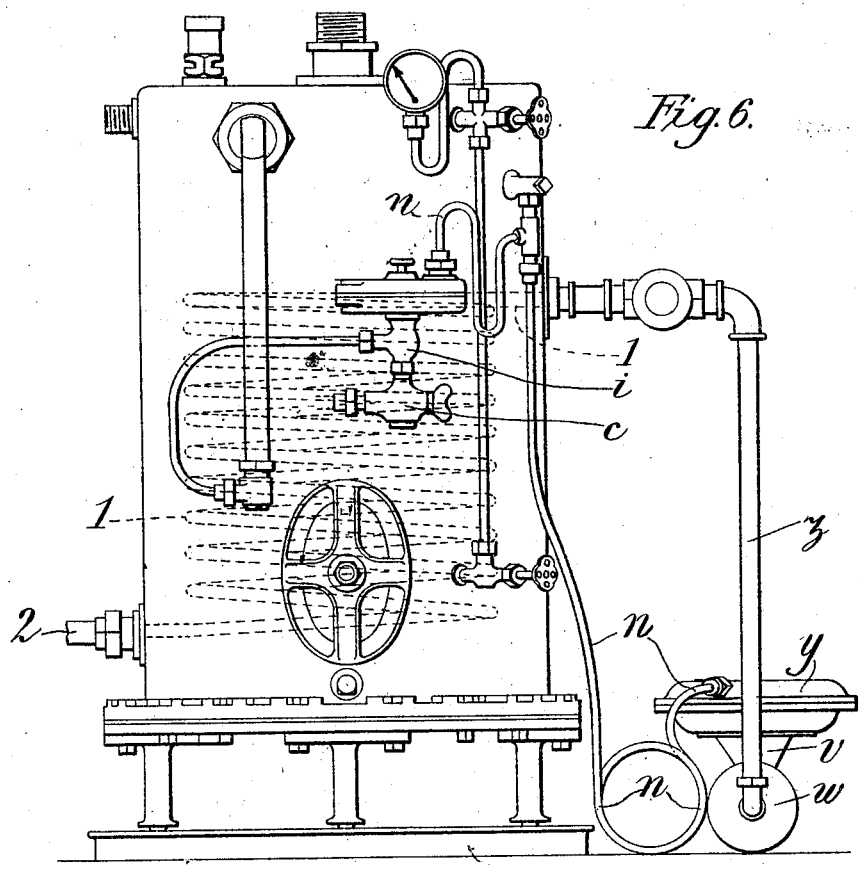
Fig. 6 is a view similar to Fig. 1 of a steam heated boiler making use of the valve shown in Fig. 4.
Figure 5:
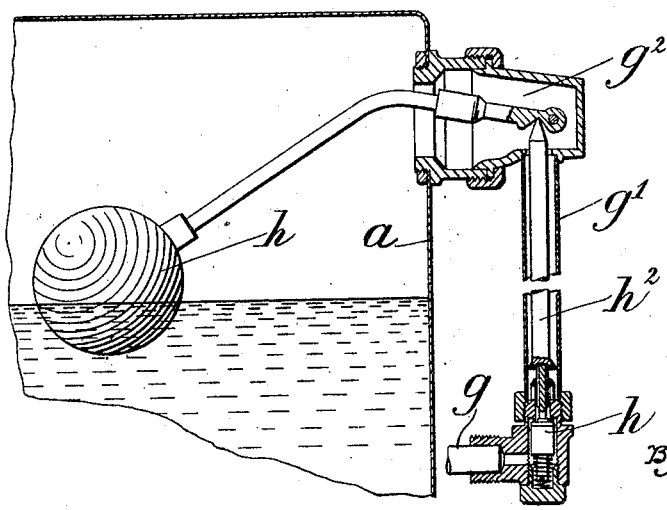
Fig. 5 is a sectional view of a part of Fig. 1 taken at right angles to the latter.

In said Fig. 4, a valve $s$ is employed fitted to a stem which passes through a stuffing box $u$ in a connector $v$ adapted to be jointed by means of a washer $u^1$ and bolts $u^2$ to a double flanged body piece $w$ for inclusion in the steam supply piping and formed with a seating $x$ to which access can be readily gained when the connector $v$ and body piece $w$ are separated. The connector $v$ aforesaid is adapted to be jointed to one wall of a flexible diaphragm pressure governor $y$ of a type similar to that of Fig. 2 the valve stem being connected to the diaphragm and the valve adapted to be urged in a direction away from the valve seat by a conical spring in opposition to steam pressure in the boiler to which the chamber of the governor casing, opposite that occupied by the spring, is connected by the piping $n$ described with reference to Fig. 1. In Fig. 6, $z$ represents the piping connecting the valve body $w$ to a heating coil 1 in the boiler $a$, 2 being piping connected to the outlet end of the coil.

The action of the regulating means is such that when the pressure in the boiler has reached a predetermined value the diaphragm operates to move the valve in closing direction, thereby throttling the supply of steam.

What I claim is:—

1. In apparatus for heating water comprising a boiler, the combination with a float actuated water admission valve of a second valve controlling the supply of water through the float valve and means causing the second valve to open as the intrinsic energy of the water in the boiler rises and to close as the said energy falls, substantially as described.

2. In apparatus for heating water comprising a boiler, the combination with a float controlled water admission valve and a second valve controlling the supply of water therethrough as specified in claim 1 of means for regulating the supply of heating medium in accordance with the intrinsic energy of the water in the boiler, substantially as described.

3. In apparatus for heating water comprising a boiler, the combination with a float controlled water admission valve and a second valve controlling the supply of water therethrough as specified in claim 1 of a third valve controlling the supply of heating medium and means adapted to automatically operate both the said second and third valves whereby the heating medium is varied inversely to the water supply as an unusually large quantity of the latter is being drawn off, substantially as described.

4. In apparatus for heating water comprising a boiler, the combination with a float controlled water admission valve, and a second valve controlling the supply of water therethrough as specified in claim 1, of a third valve controlling the supply of heating medium, means adapted to produce opening movement of said second valve and means adapted to produce in the same way closing movement of the third valve and vice versa, both said means being mutually influenced by steam pressure in the apparatus.

Signed at American consulate general this 11th day of December, 1922.

ERNEST HENRY STILL.